United States Patent [19]

Mills

[11] 4,208,665
[45] Jun. 17, 1980

[54] DYNAMOMETER FOR MONITORING SUCKER ROD STRINGS

[76] Inventor: Manuel D. Mills, 2808 Delano, Midland, Tex. 79701

[21] Appl. No.: 944,966

[22] Filed: Sep. 22, 1978

[51] Int. Cl.² .................................... G01D 9/00
[52] U.S. Cl. ......................... 346/33 WL; 73/151; 346/33 R
[58] Field of Search ............ 73/151; 346/33 WL, 112, 346/118, 119

[56] References Cited

U.S. PATENT DOCUMENTS

| | | | |
|---|---|---|---|
| 2,107,151 | 2/1938 | Higginson | 346/33 WL |
| 3,512,164 | 5/1970 | Bynum | 346/33 |
| 4,043,191 | 8/1977 | Mills | 73/151 |

Primary Examiner—Monroe H. Hayes
Attorney, Agent, or Firm—Marcus L. Bates

[57] ABSTRACT

A dynamometer for monitoring the tension in a pair of spaced, elongated members. A pen, actuated by a sensor means, measures the tension in the pair of spaced, elongated members, and places indicia upon a continuously moving chart. The indicia is related to the magnitude of the measured tension and is in the form of spaced-apart, individual curves or plots. Hence the pen contacts the chart for a first time interval; and thereafter, the pen is lifted from the chart for a second time interval so as to cyclically place the indicia upon the chart at successive intervals of time. More specifically, the dynamometer measures the tension in a rod string. The rod string is reciprocated by a pumpjack unit located above the ground and drives a downhole pump. The dynamometer therefore cyclically measures the pumping characteristics of the well at successive, predetermined intervals of time and provides a permanent record which can be stored and subsequently consulted in order to determine the characteristics of the entire pumping unit over a projected interval of time.

12 Claims, 10 Drawing Figures

DYNAMOMETER FOR MONITORING SUCKER ROD STRINGS

BACKGROUND OF THE INVENTION

In my previous U.S. Pat. No. 4,043,191 there is taught a dynamometer apparatus for measuring the tension in a pair of spaced, elongated members, and in particular, the tension in a sucker rod string associated with a downhole pump and a pumpjack unit.

Some pumpjack units are massive in construction and reciprocate a sucker rod string which extends downhole thousands of feet to a production formation where the sucker rod string actuates a downhole pump. The cost of the entire installation, including the borehole, often amounts to more than a million dollars. The downhole pump must be sized in accordance with the production rate of the hydrocarbon-producing formation as well as being properly sized respective to the pumpjack unit. An entire field of endeavor is associated with pumpjack-actuated, downhole pumps, and there are specialists in the oilpatch whose profession is to properly select the proper pump size, pump stroke, rod size, and pumping speed in order to obtain maximum production from the underlying hydrocarbon-producing formation, while at the same time, optimum, economical operation of the equipment is achieved.

A pumpjack unit preferably reciprocates the downhole pump at a speed which maintains the hydrostatic head in the borehole at an acceptable minimum. From time to time the rate of production of the formation may change, or perhaps the speed of the pumpjack or the size of the downhole pump has been improperly selected, whereupon an undesirable condition is encountered called "pump-off".

When a deep well "pumps off", fluid pounding is incurred, and this phenomenon is detrimental to the entire pumping unit and sometimes causes damage to a pump or results in a broken rod string. This is a catastrophe in the oilpatch because an expensive pulling unit must now remove the thousands of feet of rod string so that the pump can be repaired or the rod string replaced. In other instances, the pump sometimes will be undersized, or the pump speed will be inappropriate for the optimum rate of production, all of which tends to lower the production efficiency.

It therefore would be desirable to have available a means by which the characteristics of a pumpjack unit can be monitored for an extensive length of time, with the data from the monitored well being stored so that it can be rapidly consulted at some subsequent time. An apparatus by which the above desirable measurements can be realized is the subject of the present invention.

SUMMARY OF THE INVENTION

This invention relates to dynameter apparatus and specifically to a dynamometer for monitoring the pumping characteristics of a pumpjack unit at sequential, predetermined intervals of time. The dynamometer apparatus is connected to measure the change in tension in the bridle which connects a string of sucker rod to the horsehead of the pumpjack unit, with the rod string being connected downhole to a reciprocating-type, production pump.

The dynamometer includes a chart which is driven by the reciprocating action of the pumpjack unit. A sensor is connected to measure the tension in the bridle, and actuates a scribe which places indicia on the chart, with the indicia being related to the magnitude of the measured tension during one cycle of operation of the production pump.

A drive train is actuated by the reciprocal action of the pumpjack unit and actuates a cam which enables the scribe to place the indicia on the chart for a first time interval. The indicia is representative of several cycles of the pumpjack unit; and thereafter, the scribe is prevented from placing indicia on the chart for a second time interval of sufficient duration to allow the chart to move the first indicia out of the way of the scribe; and thereafter, indicia is again placed on the chart for another time interval equal to the first time interval. Accordingly, indicia is placed upon the chart at successive intervals of time, thereby enabling the well characteristics to be analyzed over a projected interval of time, and the results thereof to be stored so that it can subsequently be consulted.

In the preferred embodiment of the invention, the chart is contained rolled up on two spaced cylinders so that the unused chart is unrolled from one cylinder, while the chart containing the indicia is rolled up on another cylinder. The reciprocal action of the pumpjack unit rotates the first cylinder in one direction as the pump rod upstrokes and rotates the cylinder in the opposite direction as the pump downstrokes. The unused chart is withdrawn from the first cylinder and wound onto the second cylinder one increment of travel each cycle of the pumpjack unit. The angular clockwise and counterclockwise, rotational motion of the first chart drum is converted into reciprocal motion which is changed back into rotational motion in order to drive a gear train. The gear train drives the second drum in a forward direction, thereby enabling the second drum to receive the used paper in a rolled-up configuration about the outer peripheral surface thereof.

The drive train which actuates the second drum also actuates the above mentioned cam means in order that the scribe can be lifted from the surface of the chart at the stated, predetermined intervals of time which are related to a finite number of strokes of the pumpjack.

Accordingly, a primary object of the present invention is the provision of a dynamometer for continually monitoring sucker rod string by placing spaced indicia upon a chart means at successive intervals of time.

Another object of the present invention is to provide a means by which the characteristics of a downhole pump driven by a pumpjack unit can be monitored by measuring the tension in the bridle connected to the rod string and forming a plot which relates the measured tension to the position of the rod string during the upstroke and downstroke, suspending the measuring activity for an interval of time which enables the plot to be moved out of the path of the next plot; and thereafter again measuring the bridle tension with respect to upstroke and downstroke, to thereby provide a chart having spaced-apart indicia thereon related to one complete cycle of the downhole pump.

A further object of the present invention is the provision of a dynamometer for monitoring pumped wells at sequential, predetermined time intervals to provide data in the form of spaced curves located on a chart means.

A still further object of the present invention is the provision of a dynamometer connected for measuring the characteristics of a pumpjack-actuated, downhole pump wherein the tesnion in the rod string is recorded as a plot at sequential, predetermined time intervals.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENTS

Throughout the remainder of this specification, like numerals generally refer to like or similar parts.

Figure 1:
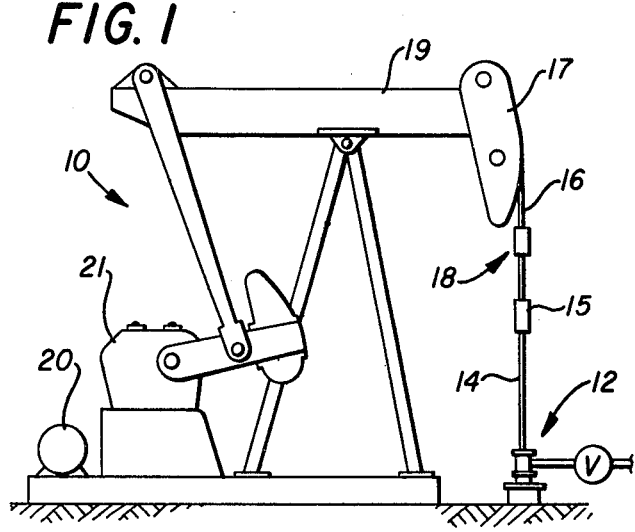
FIG. 1 is a side elevational, diagrammatical illustration of a pumpjack unit, with the present invention being schematically illustrated in combination therewith.

In FIG. 1 there is disclosed a pumpjack unit broadly indicated by the arrow at numeral 10. This unit is operatively associated with an oilwell borehole 12. A string of sucker rod 14 is connected at 15 to a bridle 16 associated with a horsehead 17 of the pumpjack unit. A dynamometer 18, made in accordance with the present invention, is removably affixed to the bridle in a manner which will be discussed in greater detail later on in this disclosure.

Cross-arm 19 is journaled to the illustrated Sampson post so that it is rocked in the conventional manner as the motor 20 drives the gearbox 21, thereby imparting reciprocatory motion into the rod string.

Figure 2:
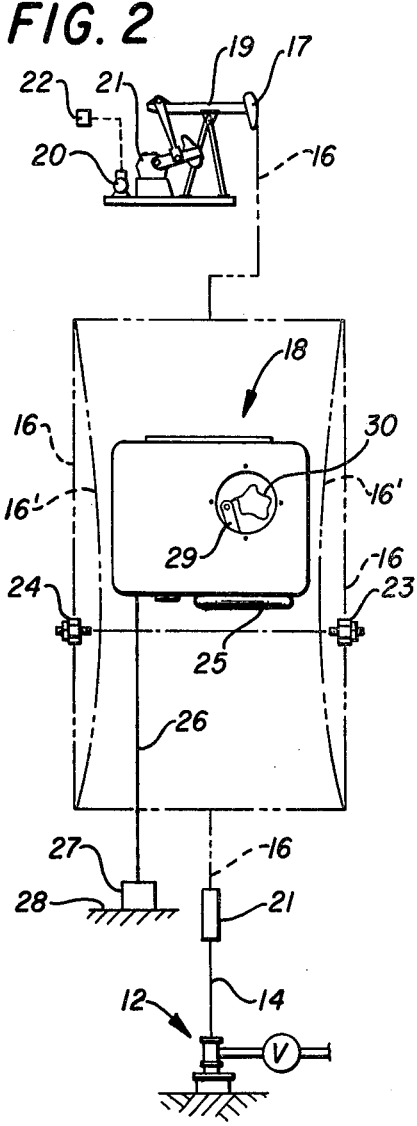
FIG. 2 is a schematical representation of the present invention in combination with a pumpjack unit.
Figure 4:
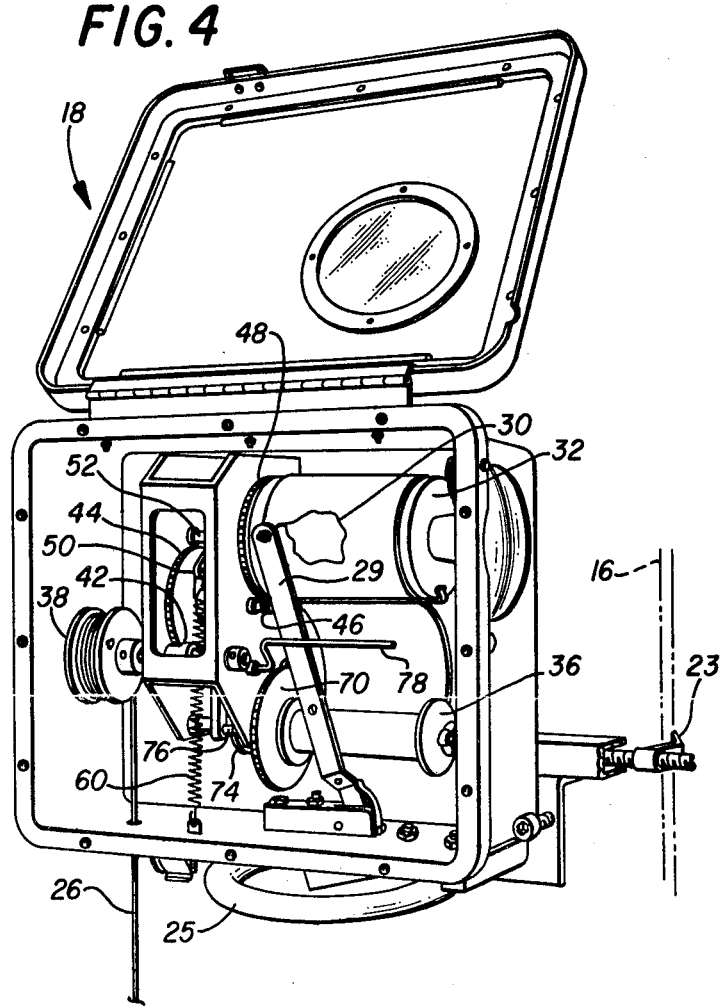
FIGS. 4 and 5 are perspective views of apparatus made in accordance with the present invention.
Figure 3:
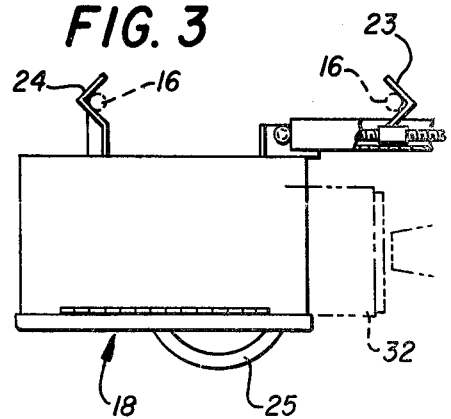
FIG. 3 is a top plan view of apparatus made in accordance with the present invention.

In FIG. 2, it will be noted that the bridle 16 is comprised of the usual spaced, parallel, elongated members. The dynamometer apparatus 18 of the present invention is attached to the bridle by means of spaced clamps 23 and 24, which deform the bridle into the exaggerated configurations seen at 16 and 16' in order that the illustrated spring member 25 can measure the change in tension in the bridle, which is also directly proportional to the weight of the rod string.

A drive cable 26, which preferably is a multi-strand nylon cord, is attached to a weight 27. The weight may be a magnet which rests on a structure 28. Accordingly, as the pumpjack unit reciprocates the sucker rod string, sensor 25 measures the change in the tension in the bridle, while the cable 26 is extended from and retracted into the dynamometer housing in a manner which will be more fully appreciated later on as the remainder of this disclosure is more fully digested.

Looking now to the details of FIGS. 4—8, the pin arm 29 is seen to have placed indicia 30 upon the paper 34 of chart drum 32. The chart paper rests on a maginal, circumferentially extending surface area of the main chart drum. A take-up drum 36 pulls the paper from within the main drum, across approximately 180° of the circumferentially extending drum surface, so that a marginal length of the chart paper is exposed in underlying relationship to the scribe, thereby enabling the scribe to move from one side to the other of the paper as the drum simultaneously rotates clockwise and counterclockwise. The details of the storage of the rolled-up paper within the drum is more specifically pointed out in U.S. Pat. No. 4,043,191.

String pulley 38 receives a marginal length of the drum actuator line 26 wound thereabout so that as the entire dynamometer apparatus is reciprocated vertically by the bridle, the cable 26 moves the pulley 38 clockwise and counterclockwise. String pulley shaft 40 is connected to the pulley and to the first pinion gear 42. The pinion gear 42 meshes with a spur gear 44 and drives shaft 45. Driven second spur gear 46 is attached to the shaft 45 and meshed with chart drum spur gear 48. The chart drum 32 is journaled to the main housing of the dynamometer.

The stroke of the rod string on almost all oil wells varies between 24 to 220 inches. Therefore, on a 100 inch stroke, with 10:1 gear reduction at 42 and 46 and a 1.5 inch diameter pulley, the chart drum is oscillated through 90° each reciprocation of the rod string. This arrangement makes possible the use of the present invention on almost all pumpjack units without changing the pulley diameter.

Take-up arm 50 is attached to shaft 52, which in turn is attached to the main chart drum shaft. Crank 54 reciprocates shaft 56 as the drum is driven in a clockwise and counterclockwise direction. Crank 58 drives a ratchet mechanism at 66 which is in the form of a rack 66 and pawl 80, which drives the gear 66 in a counterclockwise direction. Shaft 64 is attached to spur gear 66 and pinion gear 68. Gear 68 drives storage chart drive gear 70. Gear 70 is affixed to the end of shaft 72 and to the central axis of the chart storage drum 36.

Cam 74 is attached to shaft 72 and rotates therewith. Cam follower 76 rides on the outer peripheral surface of cam 74 and actuates a pin lifter arm 78 so that the scribe 29 is lifted from the surface of the chart for about 345° of rotation of shaft 72; and thereafter, the cam drops the pin lifter arm so that the scribe can place indicia on the chart for about 15° of rotation of the shaft.

On a well making eight strokes per minute or 480 strokes per hour, the stylus is picked up 460 strokes and dropped for 20 strokes. Where deemed desirable, a multi-lobed cam is employed to double or triple the recording intervals.

Figure 5:
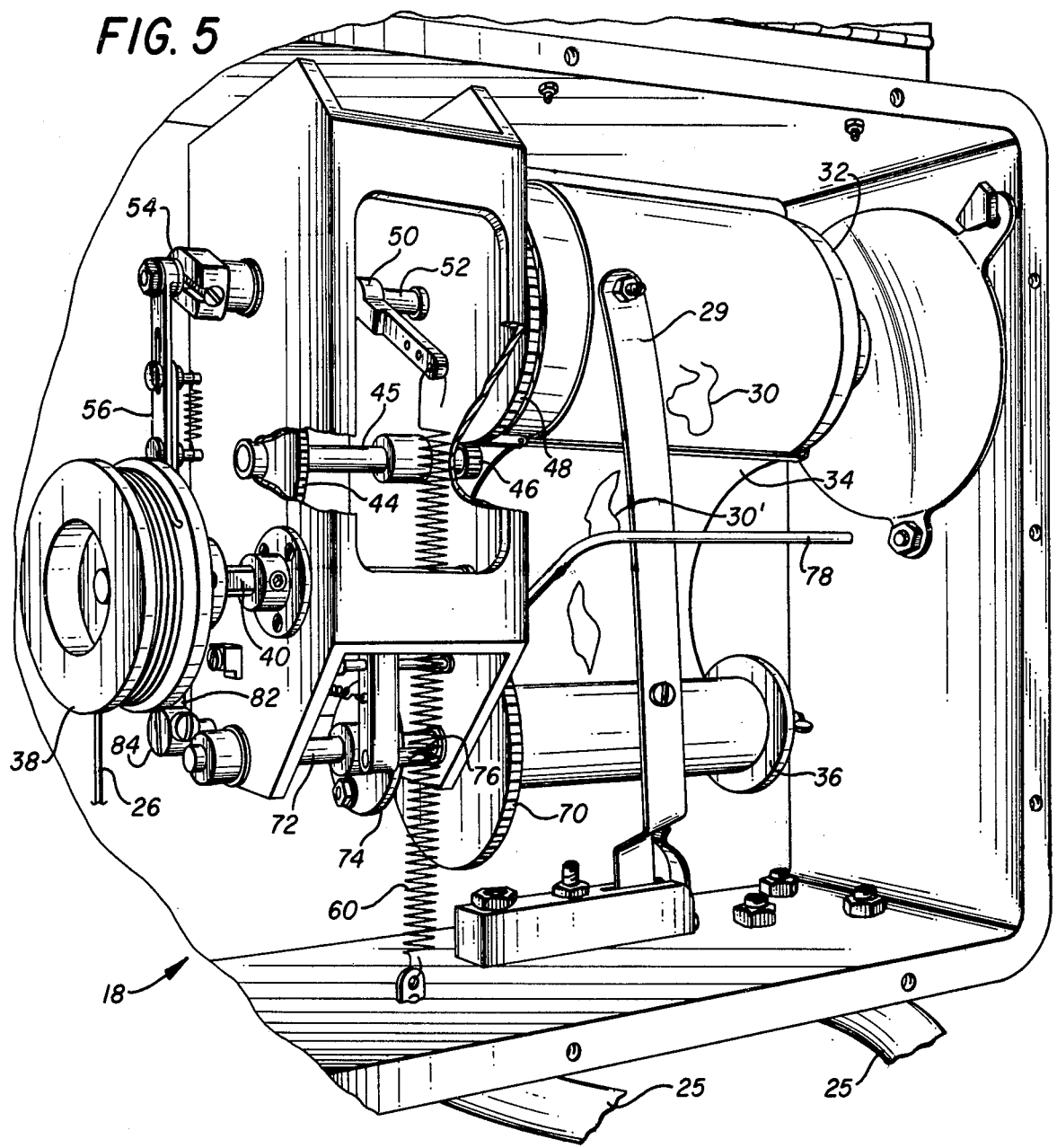
Figure 6:
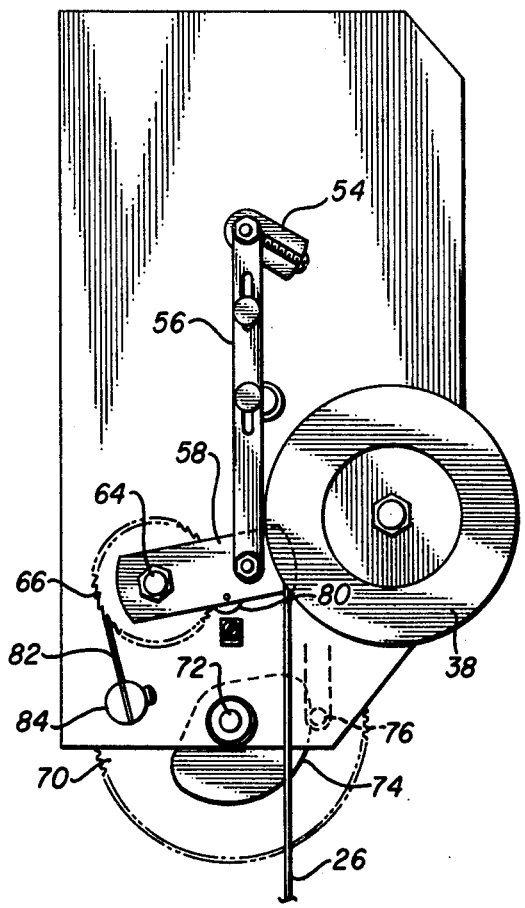
FIG. 6 is an enlarged, side elevational view of the apparatus disclosed in FIGS. 4 and 5.
Figure 7:
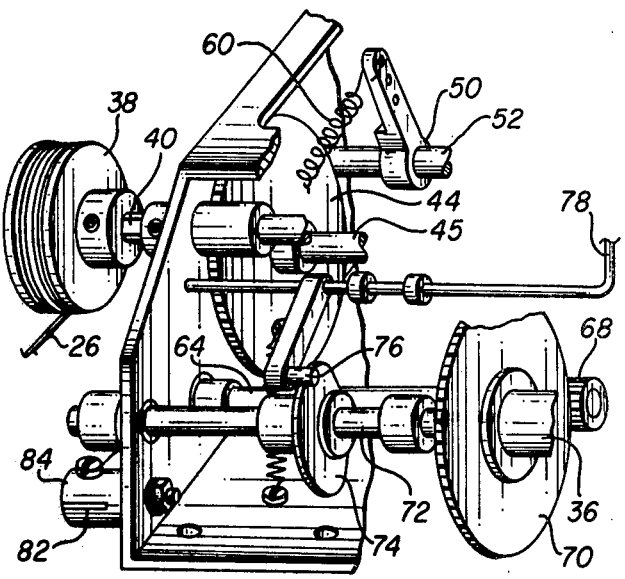
FIG. 7 is a broken, perspective view of part of the apparatus disclosed in FIGS. 3-6.

Looking now to the details of FIGS. 5 and 6, it will be noted that the connecting rod 56 is of two-piece construction and spring loaded so that the overlapping marginal ends thereof can be moved relative to one another, thereby enabling the connecting rod to be resistingly shortened should it override toward the end of an oscillation. The connecting rod reciprocates member 58 in a clockwise and counterclockwise direction as pawl 80 engages a tooth and drives rack 66 in a forward direction; and thereafter, spring member 82 engages and prevents rack 66 from reversing its direction of travel. Member 84 anchors the spring member 82 in operative relationship respective to the rack. Hence the pawl, acting against the teeth of the rack, advances the rack one notch while the spring engages a notch to prevent opposite rotation of the rack.

Figure 9:
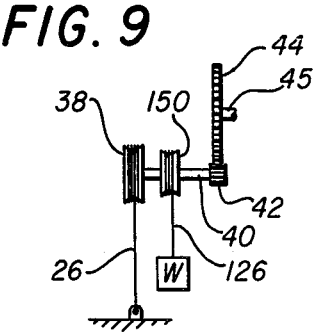
FIG. 9 is an isolated, detailed view of a modification of part of the apparatus disclosed in the foregoing figures; and, FIG. 10 is a part cross-sectional, top plan view of another form of the present invention.

In FIG. 9 it will be noted that cable 26 is wound up on pulley 38 in a clockwise direction, while a return cable 126 is wound up on a return pulley 150 in a counterclockwise direction. As pulley 38 travels away from line 26, thereby imparting rotation into shaft 40, cable 126 is wound upon pulley 150, thereby enabling the indicated weight to store energy so that as the bridle travels in a downward direction, the weight causes cable 126 to provide for opposite rotation of shaft 40, thereby eliminating the need for the spring 60.

In one embodiment of the invention, the rack is provided with 48 notches so that 48 strokes of the pumpjack advances the shaft 64 one revolution. Gears 68, 70 are 10:1 ratio so that cam 74 is turned one revolution each 480 strokes. At 12 strokes per minute well operation, and using a double-lobed cam, the pin is picked up for 20 minutes for 460 strokes, and released for one minute for 12 strokes. The diagram is drawn during the 12 strokes.

OPERATION

In operation, the main housing of the dynamometer is positioned in the illustrated manner of FIG. 2, and each cable 16 of the bridle is captured within the clamp means 23 and 24. Member 23 is moved toward member 24 until the proper tension 16' is achieved in the bridle, so that the spring member 25 can respond throughout each cycle to drive pen 29 over a suitable area located on the chart. The details of members 23, 24, and 25 are set forth in the above mentioned patent. Weight 27, which may be a magnet, is positioned on a suitable support structure near the pumping tee and the pumpjack unit energized.

As the pumpjack unit reciprocates the string of sucker rod, the dynamometer apparatus is cyclically lifted and lowered during the pumping operation. As the dynamometer housing is carried vertically upwardly by the bridle, the pulley 38 drives the dispenser drum 32 in a forward direction, causing shaft 52 to rotate, while energy is stored within the spring 60. At the same time, crank 54 reciprocates connecting rod 56, which in turn imparts reciprocatory motion into the ratchet mechanism. The oscillatory movement of the drum provides the Y ordinate of the curve 30, while the spring member 25 moves the scribe to provide the X component of the curve 30. The curve 30 is called a dynamometer card.

As the pumpjack unit reaches the end of its stroke and commences to travel in the opposite direction, line 26 is wound onto spool 38 due to the biasing force provided by spring 60, which rotates the drum in the opposite direction and at the same time reciprocates the shaft 56 back to its original position. As the drum 32 is rotated back to its original position, the tension in the sucker rod moves the pin along the X axis while the rotation of the drum provides the Y component of the curve 30.

Each cycle of the pumpjack moves the drum in a clockwise and counterclockwise direction, which also reciprocates the connecting rod 56 through one cycle of operation. The connecting rod moves the pawl associated with the rack, thereby advancing the rack one notch.

The gear 66 continues to rotate shaft 64 one increment each cycle of operation, thereby winding the used chart paper onto the storage drum 36. The cam follower 76 lifts the scribe from the paper after a predetermined number of cycles of operation, until the curve 30 has moved toward storage spool 36 a sufficient amount to enable the next curve to be drawn by the scribe in such a manner that the indicia 30, 30' are spaced apart from one another.

The chart paper is stored within drum 32 and is withdrawn through a lateral slot formed therein in accordance with my previously mentioned patent. The paper strip between the two drums is loosened as the drum 32 rotates in a first direction and tightened as the drum 32 is rotated in the opposite direction. The paper is withdrawn a small increment each time it is tightened because storage drum 36 has been advanced a small amount.

In this respect, assuming the gear ratios are selected to cause the scribe to trace for 20 cycles before being lifted from the chart drum, there will be 20 diagrams superimposed on one another as the chart paper moves 20 small increments. The movement of the chart paper during the drawing of the diagram widens the mark or line forming the curve and is not radically different from the diagrams those skilled in the art are accustomed to viewing. Moreover, should the well characteristics change during the drawing of the twenty superimposed curves, the difference sensed by the spring 25 is readily observed because of the departure of one curve from the remaining nineteen curves which jointly constitute the card.

Figure 10:
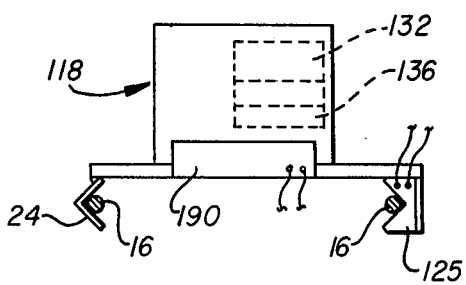

In FIG. 10, the clamps are attached to the cables 16 of the bridle in the before described manner, with a load cell at 125 bearing against one of the spaced, parallel cable members. The load cell preferably is electrically actuated and provides a signal at the illustrated two electrical conductors. The conductors are connected to electronic circuitry 190 by the illustrated two electrical conductors extending therefrom. Housing 118 contains chart paper wound about a dispenser spool 132 and a storage spool 136, with the chart paper being wound thereon in the before described manner of the first embodiment of this invention.

Figure 8:
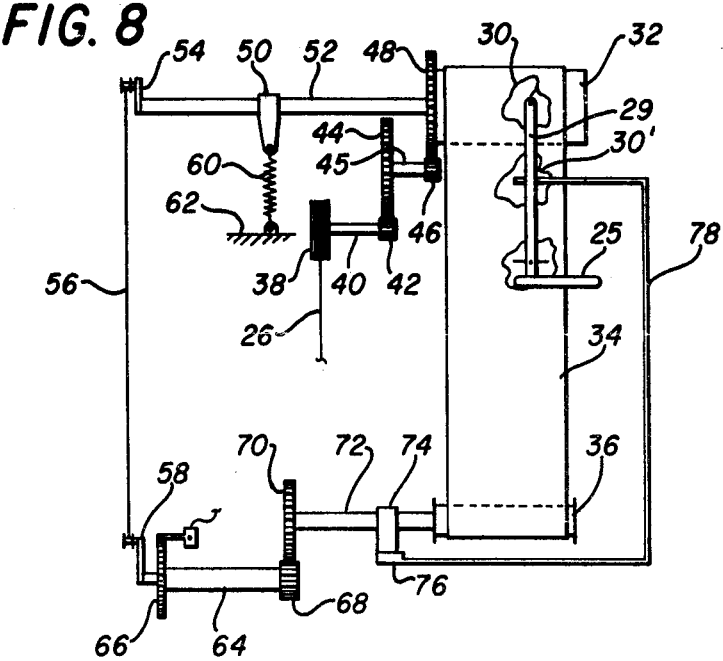
FIG. 8 is a schematical representation which sets forth the operational details of the present invention.

Indicia related to the position of the rod string and the tension therewithin is placed on the chart paper in the manner similar to the embodiment of FIG. 8. Accordingly, FIG. 10 schematically illustrates alternant means by which the tension within the rod string can be measured.

I claim:

1. Apparatus for measuring tension in a pair of spaced, elongated, parallel members which cyclically reciprocate in a direction parallel to the members comprising, in combination:

a sensor means, spaced clamps attached to bias said spaced members out of parallel relationship, said sensor means being attached to said spaced clamps and producing a signal having a magnitude which is proportional to the biasing force;

a scribe mounted to be moved in proportion to the magnitude of said signal; chart means positioned so that movement of said scribe relative to said chart means provides indicia on said chart means;

means responsive to the reciprocal motion of said spaced, elongated, parallel members for oscillating said chart means in a forward and then a reverse direction;

means responsive to the oscillatory movement of said chart means for successively advancing the chart means a finite increment of travel for a finite number of oscillations to cause the position of the oscillating chart relative to the scribe means to be continuously changed;

means responsive to said means for advancing said chart by which the scribe is caused to place indicia related to a curve on said chart for at least one cycle of reciprocating movement of said members; and thereafter, prevent said scribe from placing indicia on said chart until the indicia last placed on the chart has advanced sufficiently for a second curve to be placed on said chart in spaced relationship to the first curve.

2. The apparatus of claim 1 wherein said chart means includes a first and second chart drum which stores a length of chart paper in rolled configuration, said chart paper being transferred from said first to said second chart drum at a rate which is proportional to the rate of reciprocation of said parallel members.

3. The apparatus of claim 2 and further including a pulley, a cable means having one end roved about said pulley and the other end fixed respective to said members; a gear train means connecting said pulley to said first chart drum so that longitudinal movement of said parallel members causes said pulley to rotate several revolutions while said chart drum is rotated less than one revolution, thereby moving said chart drum respective to said scribe and forming the Y axis of a curve.

4. The apparatus of claim 3 wherein the oscillatory motion of said first chart drum drives a ratchet assembly, said ratchet assembly moves said second drum in order to withdraw chart material from said first chart drum.

5. The apparatus of claim 4 and further including a cam means rotated by said ratched assembly; a cam follower actuated in response to rotation of said cam means;

means by which said scribe is lifted from said chart by said cam follower each rotation of said cam means so as to cyclically intervene between alternate times in which the scribe is placing indicia upon the chart.

6. Dynamometer apparatus connected to measure the change in tension in a string of sucker rod connected to a pumpjack unit by a bridle, comprising, in combination:

clamp means attachable to the bridle of the pumpjack unit such that the two elongated cables of the bridle are sprung out of parallel relationship respective to one another, thereby causing relative movement between said clamp means as the tension within the bridle cables changes during each stroke of a pumpjack unit;

a scribe means mounted to move in proportion to a change in the sprung relationship of said bridle;

means by which a chart is mounted respective to said scribe means to cause said scribe means to place indicia on said chart related to the tension within the bridle cables;

first means responsive to vertical movement of said string of sucker rod for moving said chart relative to said scribe means to cause indicia to be placed on the chart related to the vertical position of the rod string; so that the combined movement of the scribe means and the chart produce a curve related to the pumping characteristics of the pumpjack unit;

second means, responsive to the reciprocation of said rod string for successively advancing the chart means an increment of travel respective to the scribe means; said second means being connected to prevent said scribe from placing indicia on said chart for a time interval which enables the chart to move away from the scribe an amount to provide spaced, successive curves related to the stroke and tension of the sucker rod.

7. The combination of claim 6 wherein said first means includes a first and second roller which receives a length of chart paper; said chart paper being unwound from the first roller and placed on the second roller at a rate proportional to the rate of reciprocation of the rod string.

8. The combination of claim 6 wherein said second means includes means connected to permit said scribe to place indicia upon said chart for a first number of strokes of the rod string and thereafter prevent said scribe from placing indicia upon the chart paper for a second number of strokes and thereafter again permits the scribe to place indicia upon said chart for another number of strokes equal to said first number of strokes.

9. The combination of claim 6 wherein said first means includes a first and second roller which receives a length of chart paper in roller configuration, said chart paper being unwound from the first roller and stored on the second roller at a rate proportional to the rate of reciprocation of the rod string;

said second means includes means connected to permit said scribe to place indicia upon said chart for a first number of strokes of the rod string and thereafter prevents said scribe from placing indicia upon the chart paper for a second number of strokes and thereafter again permits the scribe to place indicia upon said chart for another said first number of strokes.

10. The combination of claim 6 wherein said first means includes a pulley, a cable means having one end roved about said pulley and the other end fixed respective to stationary structure associated with the pumpjack unit; a gear train means connected to effect the recited movement of the chart respective to the scribe in such a manner that the chart moves in proportion to movement of the bridle.

11. The combination of claim 10 wherein said second means includes a ratchet assembly, a cam means connected to interrupt the action of the scribe when the cam means is actuated, means by which the ratchet assembly actuates the cam means and also moves the chart respective to the scribe one increment of travel each cycle of movement of the bridle.

12. In an oilwell having pumping apparatus which includes a downhole pump connected to a pumpjack apparatus by a rod string, the method of recording the pumping characteristics of the pumping apparatus comprising the steps of:

(1) measuring the tension in the rod string and moving a scribe across a chart to provide one axis of a plot which is related to the magnitude of the measured rod tension;

(2) moving the chart respective to the scribe to provide the other axis of a plot by using the reciprocal motion of the rod string to reciprocatingly move the chart in a forward and then a reverse direction; said other axis being related to the position of the rod string;

(3) simultaneously carrying out steps (1) and (2) at sequential, predetermined intervals of time to provide a dynamometer card;

(4) advancing the chart between said predetermined intervals of time while intervening the action of the scribe respective to placing indicia on the chart to provide spaced plots related to the pumping characteristics of an oilwell;

(5) carrying out steps (3) and (4) by using the reciprocating movement of the chart to successively advance the chart an increment of travel respective to the scribe; and, (6) using the advancing movement of the chart to cause the scribe to place the dynamometer card on the chart for at least one cycle of reciprocal movement of said chart, and thereafter to lift the scribe from the chart for the number of reciprocal movements of the chart required to carry out step (4).

* * * * *